Figure 1:
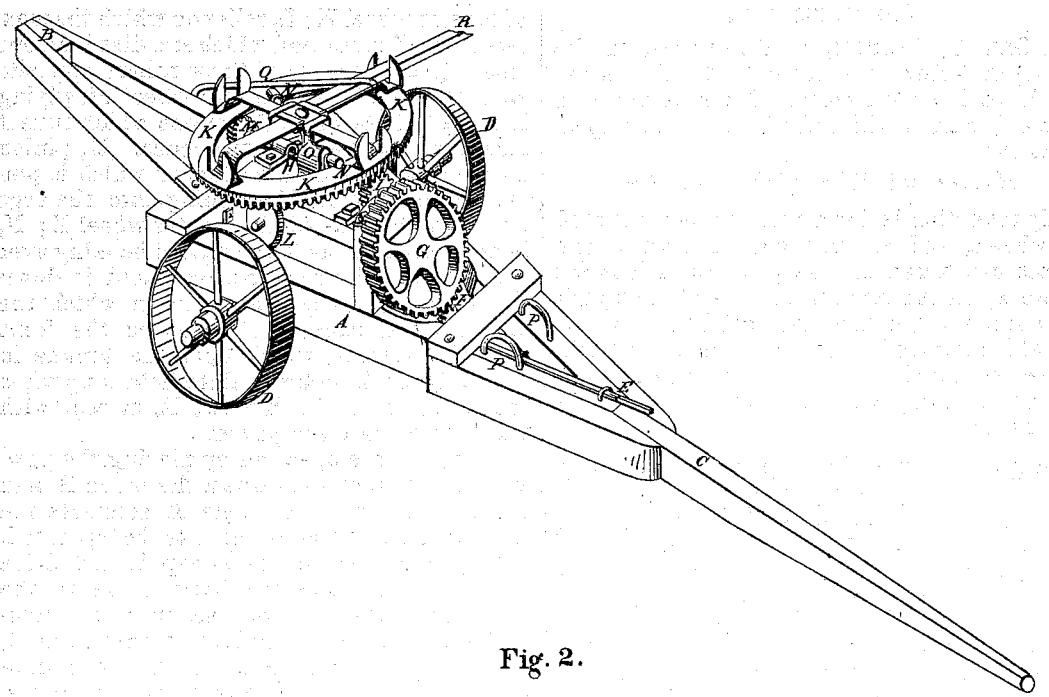

O. O. STORLE.

Improvement in Horse-Powers.

No. 126,912. Patented May 21, 1872.

WITNESSES: INVENTOR:

UNITED STATES PATENT OFFICE.

OLE O. STORLE, OF MILWAUKEE, WISCONSIN, ASSIGNOR TO HIMSELF AND JOHN O. OVERBY, OF SAME PLACE.

IMPROVEMENT IN HORSE-POWERS.

Specification forming part of Letters Patent No. 126,912, dated May 21, 1872.

SPECIFICATION.

I, OLE O. STORLE, of Milwaukee, in the county of Milwaukee, in the State of Wisconsin, have invented certain Improvements in Horse-Power, of which the following is a specification:

Nature and Object of the Invention.

My invention is for a horse-power mounted on wheels, and so arranged that when the horses are taken off the power and it is set for work, the tumbling-rod lies just low enough for work, and the master-wheel has a central pin which guides it, which is unusual with machines mounted on wheels; and the connection of the tongue to the power is of a peculiar character.

Description of the Drawing forming part of this Specification.

Figure 2:
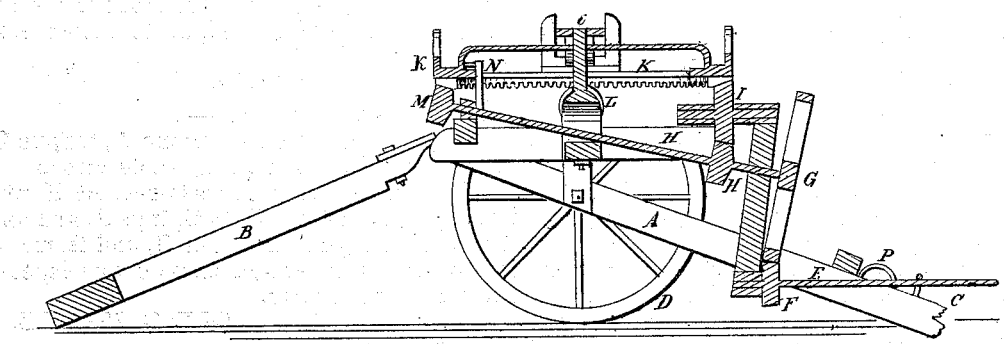

Figure 1 is a perspective view of my invention, and Fig. 2 is a longitudinal sectional view of same.

General Description.

A is the frame of the power; B, the rear brace, hung to the frame by hinges at the forward end, and held up, when the power is moved from place to place, by the hook Q; C, the tongue, which is made crotched, with a bar across the end, which, when the tongue is in place, lies across the forward end of the frame A and behind the loops P in the frame. These loops prevent the tongue from sliding forward, and the tumbling-rod, coming over the tongue, holds it in position. A piece of wood or any other substance may be placed across under the loops, to prevent the tongue from sliding out of place. D, wheels on which the power stands; E, the tumbling-rod; F, pinion on the end of the tumbling-rod; G, wheel into which pinion F meshes; H, pinion on the shaft on which wheel G runs, and meshing into pinion I, this pinion I meshing into cogs on the under side of master-wheel K; L, roller on which the master-wheel K rests, and which steadies it on one side. There are two of these rollers opposite each other under the master-wheel, steadying it on two sides, while the pinion which runs it steadies it on the other two sides. M, pinion on the other end of the shaft on which is pinion H; this pinion M meshing into the cogs on the under side of the master-wheel K; N, lugs secured to the frame A, and hooking over the inside of the master-wheel, hold it down to its place; O, the center-pin on which the master-wheel runs; P P, loops on the front end of frame A, which hold the tongue in place; Q, hook on brace B, to hold it up when the power is to be moved; R, sweep, with which to operate the power.

This power is operated by placing the power in position, staking down the brace B, and the forward part of frame A connects the tumbling-rod to the machine to be operated. Hitch the horses to the sweep R and drive ahead. When it is necessary to move the power to another place, disconnect the tumbling-rod, turn up brace B, put on tongue C, and hitch your horses to the machine and drive to the point where the power is wanted for use. As the tumbling-rod is at the front end of the power it is easily adjusted, as to distance, in any place.

Claim.

I claim as my invention—

1. The combination of frame A, tongue C, and loops P P, substantially as described.

2. The combination of master-wheel K, pinions F, H, I, and M, wheel G, lugs N, and rollers L, tumbling-rod E, brace B, and frame A, arranged to be operated on two wheels, substantially as set forth.

OLE O. STORLE.

Witnesses:
J. B. SMITH,
F. E. SMITH.